July 22, 1952    C. M. TUTTLE ET AL    2,604,376
HIGH-SPEED OSCILLOGRAPH CAMERA
Filed March 1, 1946    5 Sheets-Sheet 1
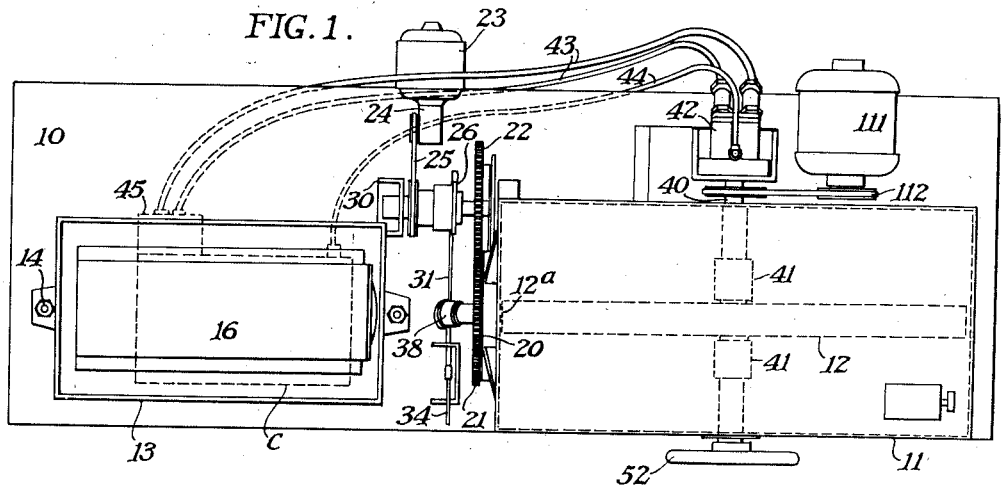
FIG. 1.
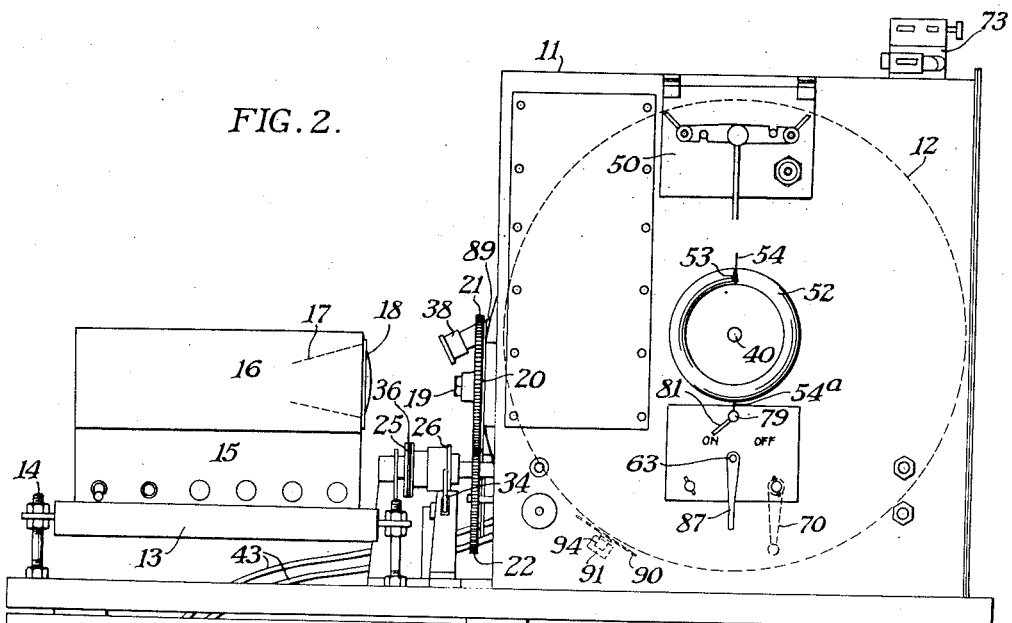
FIG. 2.
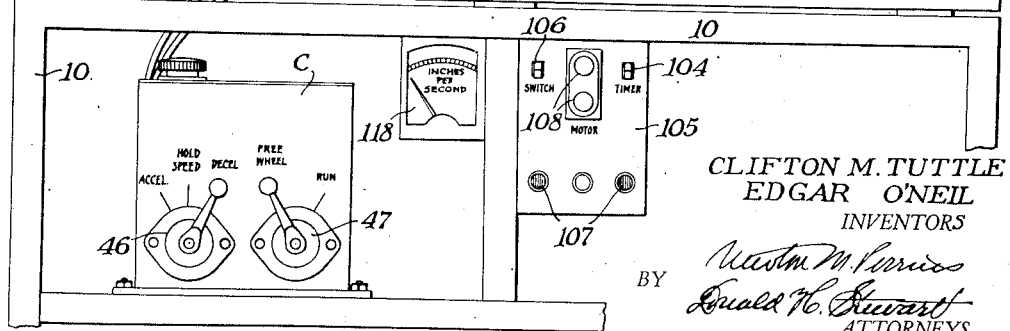
CLIFTON M. TUTTLE
EDGAR O'NEIL
INVENTORS
BY
ATTORNEYS

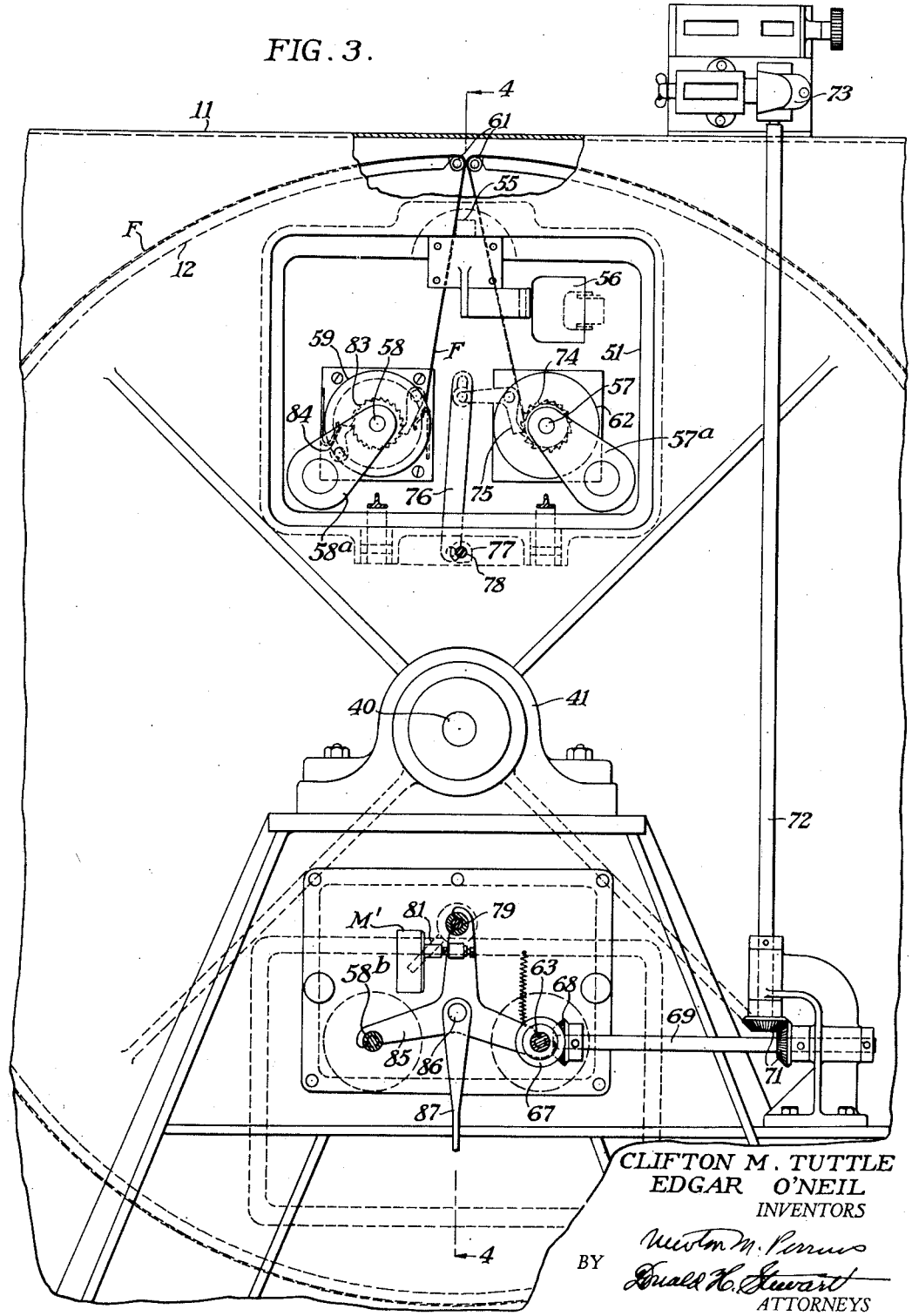

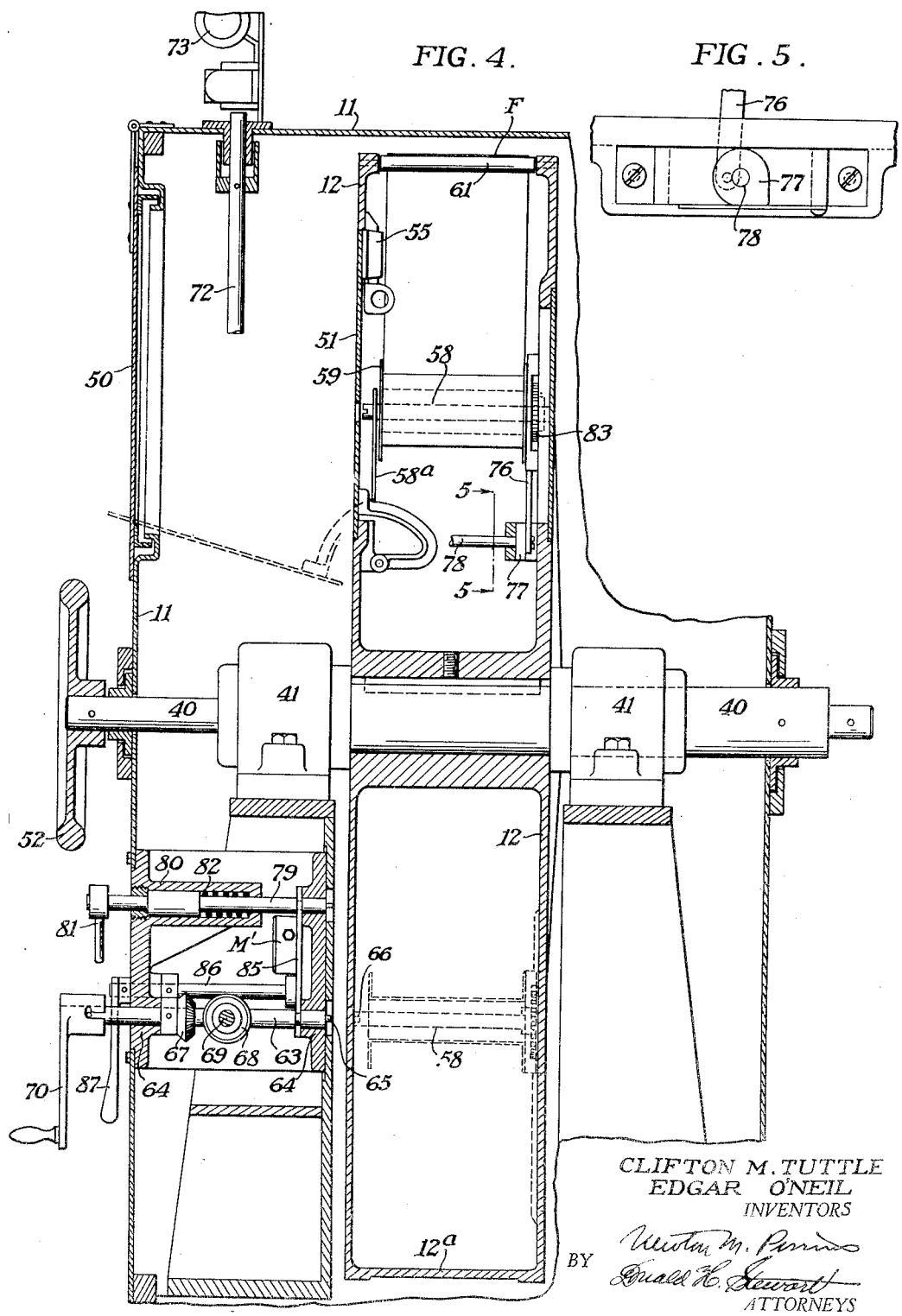

July 22, 1952   C. M. TUTTLE ET AL   2,604,376
HIGH-SPEED OSCILLOGRAPH CAMERA
Filed March 1, 1946   5 Sheets-Sheet 4
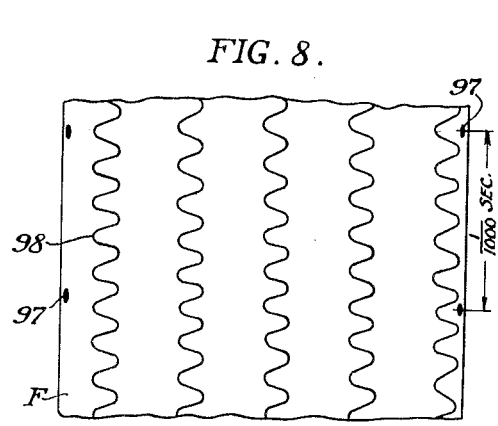
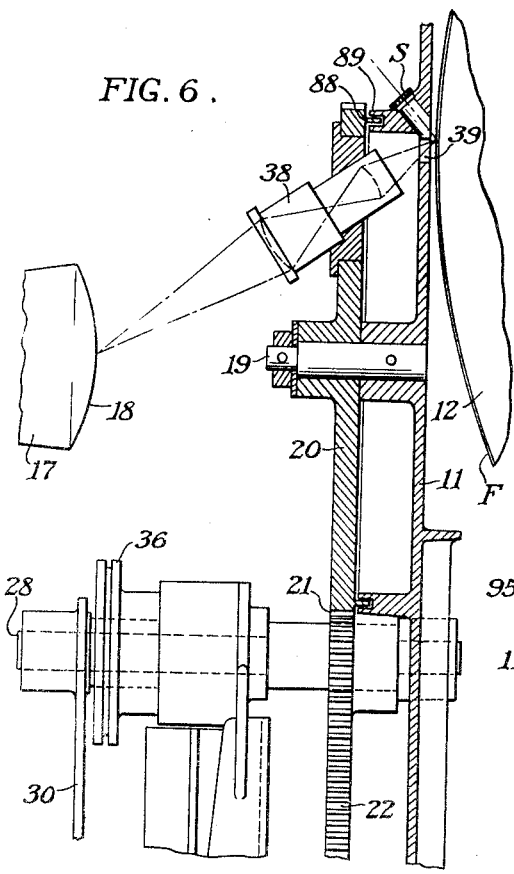
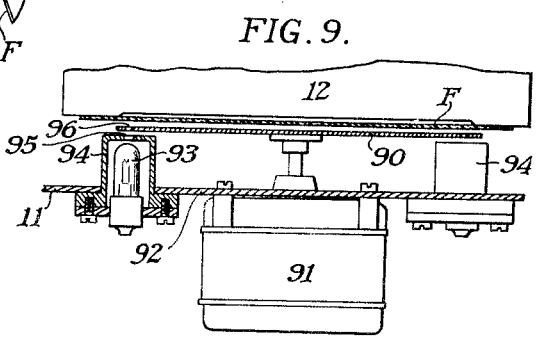
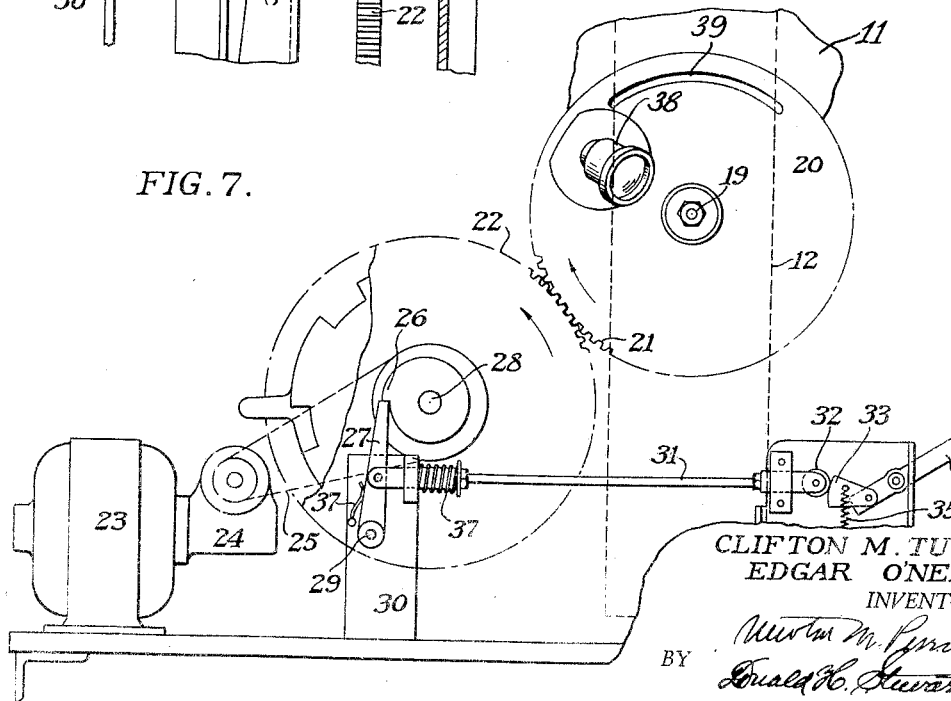
CLIFTON M. TUTTLE
EDGAR O'NEIL
INVENTORS
BY
ATTORNEYS July 22, 1952  C. M. TUTTLE ET AL  2,604,376
HIGH-SPEED OSCILLOGRAPH CAMERA
Filed March 1, 1946  5 Sheets-Sheet 5
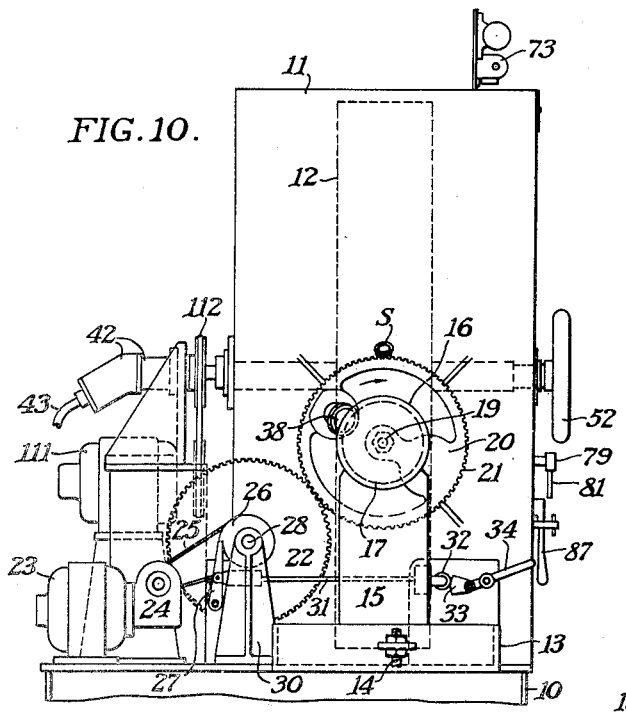
FIG. 10.
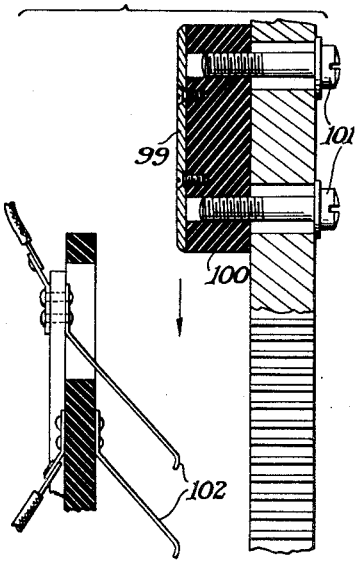
FIG. 13.
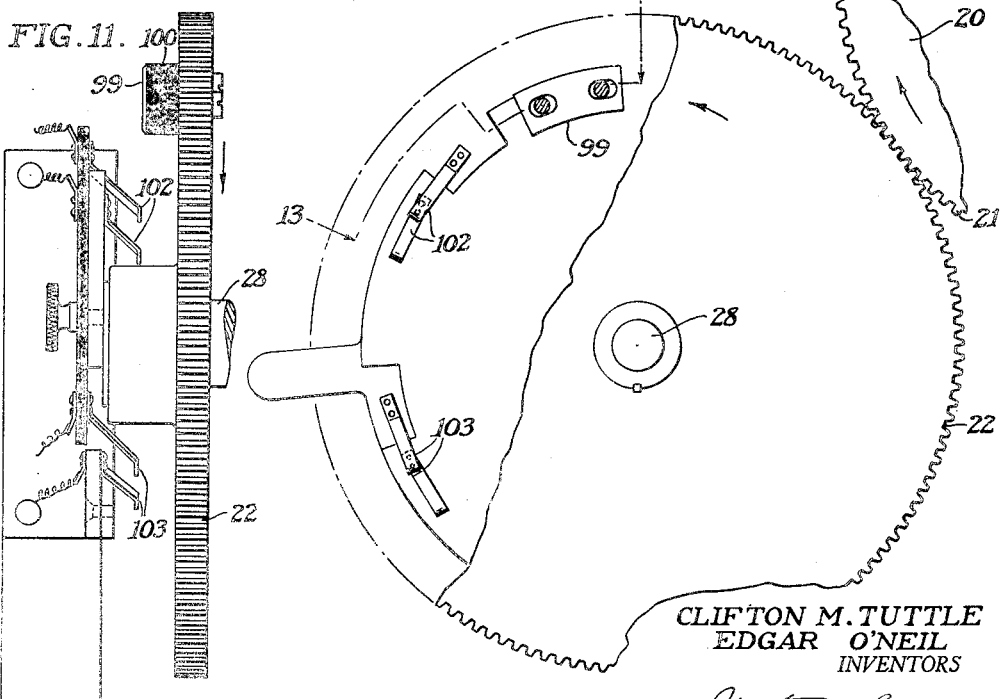
FIG. 11.
FIG. 12.
CLIFTON M. TUTTLE
EDGAR O'NEIL
INVENTORS
BY
ATTORNEYS Patented July 22, 1952

2,604,376

UNITED STATES PATENT OFFICE 2,604,376

HIGH-SPEED OSCILLOGRAPH CAMERA

Clifton M. Tuttle and Edgar O'Neil, Rochester, N. Y., assignors to Eastman Kodak Company, Rochester, N. Y., a corporation of New Jersey Application March 1, 1946, Serial No. 651,232

11 Claims. (Cl. 346—110)

This invention relates to photography and more particularly to high-speed cameras particularly designed for photographing cathode ray oscillograph traces by super-imposing an image of the screen on a moving film. One object of our invention is to provide a camera of the type described which is capable of extremely high-speed exposures. Another object of our invention is to provide an oscillograph camera in which a spiral trace may be obtained on a film. A still further object of our invention is to provide a camera of the class described in which the pitch of the spiral trace can be adjusted for the particular type of work at hand. A still further object of our invention is to provide a trace on a film in which there are also impressed markings by which the fluctuations in the trace can readily be counted and thus, the number and speed of the oscillations of the trace can be obtained. Other objects will appear from the following specification, the novel features being particularly pointed out in the claims at the end thereof.

In high-speed recording cameras, such as are used for oscillographs, cameras are known in which film is wrapped around a drum to be exposed for recording a trace, or record. Such cameras may have lenses for producing an image on the film wrapped around a drum, but, so far as we are aware, no cameras have been designed which are capable of obtaining excessively high speed and which are capable of making either a single trace, or a spiral trace, on a film wrapped around the drum through relative movement between a camera objective and drum.

In order to indicate what may be accomplished by our invention, we might point out that in the preferred embodiment of our invention, shown in the drawings, we are able to provide a mechanism for moving film at variable rates and in which film may be moved at a speed of 2000 inches per second, which means, of course, that the film is moving at a rate of 10,000 feet per minute. Such a speed may be obtained with a drum circumference of 105.24 inches and a drum speed of about 19 revolutions per second. It is, of course, necessary to have the drum very carefully balanced and the parts carefully made for such high speeds. We provide a mechanism by which the drum may be gradually brought up to the required speed before the objective is released to move across the film to make a trace thereon. With our apparatus, it has been possible to make a clearly-defined trace of oscillations of as high as 1,000,000 per second. Obviously, other and perhaps still higher speeds might be obtained utilizing our invention by building a camera of other dimensions. However, in order to get the maximum definition, we have to carefully correlate the lens, the image screen, and the location of the film, and we have, by way of example, used a known type of $f/1.6$ lens of 50.9 mm. focal length, the long conjugate by distance from the front glass surface to the center of the oscillograph screen being 109 mm. and the short conjugate (lens to film) 43.3 mm. The lens was adjusted for best performance at these conjugates and for blue light from the screen. By selecting the proper focal length and angle for the objective axis, and by selecting the proper drum size, the curved image trace may be made to lie so close to the theoretical photo plane of the objective that a clear, sharp, and well-defined image of the trace may be formed on the film. We have described somewhat in detail the specifications of the more essential parts of our preferred form of camera, by way of illustration, and to give a picture of what we have been able to accomplish with such a machine, but we, nevertheless, do not wish to be restricted in any way by this illustration, as it is obvious that cameras can readily be constructed with different dimensions from those given above.

Coming now to the drawings wherein like reference characters denote like parts throughout:

Fig. 1 is a top plan view of the apparatus;

Fig. 2 is a front elevation projected from Fig. 1;

Fig. 3 is a side elevation on a larger scale showing the drum mounting and the film control means;

Fig. 4 is a vertical section on line 4—4 of Fig. 3;

Fig. 5 is a fragmentary elevation in section on line 5—5 in Fig. 4;

Fig. 6 is a vertical section through the turret;

Fig. 7 is a front view of the turret and its release latch;

Fig. 8 is a section of a film strip illustrating its appearance after exposure and development;

Fig. 9 is a plan-section of the timing lamps;

Fig. 10 is a partial front elevation of the lens turret and associated parts;

Fig. 11 is a side view of part of Fig. 10, showing certain electrical elements;

Fig. 12 is a front view thereof; and

Fig. 13 is a detail of the turret contacts.

Referring first to Figs. 1 and 2, a base or table 10 is provided to support the components of the apparatus, and at one end thereof is a rectangular casing 11 enclosing the drum aforementioned, here designated generally by numeral 12. At the opposite end of the table is a suitable support 13, which may be leveled by adjusting studs 14. An oscillograph or receiver 15 may be carried by the support 13, having a hood or enclosure 16 surrounding a cathode tube 17 with its fluorescent surface 18 directed toward the drum 12 and aligned with the vertical central plane of the latter.

The cathode tube 17 is coaxial with a center support stud 19 on which is mounted a part 20 designated as the turret. This is a disk having gear teeth 21 mating with a second gear 22 of the same diameter as the turret gear, and is driven by a motor 23 through a suitable reduction gearing 24 and chain 25. We prefer to provide pairs of gears to replace gears 20 and 22 having different ratios so that the speed of movement of the objective carrying member shown here as 20 can be altered to procure different relationships with the speed of the film in the drum 12. A one-tooth ratchet 26, Fig. 7, on the shaft 28 is normally held against rotation by a pawl 27, pivoted at 29 on a stand 30. A rod 31 attached to the pawl 27 has a terminal roller 32 in contact with a cam 33 which may be shifted by a release lever 34. When the latter is depressed, cam 33 is raised against the action of a spring 35 and the resultant thrust disengages pawl 27 from the tooth of ratchet 26. A clutch 36, Fig. 6, which slips during the time when the ratchet is held by the pawl, is thus permitted to drive the gear 22 and through it the turret 20. The lever 34 is released immediately after being depressed, so that the spring 35 may return the parts to normal and thereby enable another spring 37 to press the pawl 27 into position to stop the gear 22, and likewise the turret 20, after one full revolution.

The turret 20 has a photographic objective 38 of suitable characteristics mounted near its periphery and extending through it at an angle to the stud 19. This angle is such that the optical axis of the objective is always directed at the center of the fluorescent surface 18 of the oscillograph tube 17. The critical focus of the objective is at the surface of the film F on the periphery of drum 12. An arcuate slot 39, as in Figs. 6 and 7, of required length permits the image of a vibrating luminous spot on the surface 18 to be projected onto a film wrapped around the drum, as will be hereinafter more fully described.

During the time the mechanism above described completes one cycle and again comes to rest, the objective 38 sweeps a beam of light across the full width of drum 12. During such a sweep the drum may revolve from one to twenty times, in accordance with the speed control thereof, so that the beam focused on the surface of the drum will describe a helical path of greater or less pitch and length around the periphery of the drum.

It has been found that for close control and steady speed a hydraulic drive for the drum is preferable to an electric motor or other power source. To this end, the shaft 40 of the drum, Fig. 1, suitably supported in bearings 41 within the casing 11 is coupled to a fluid-operated motor 42, connected by tubing 43, 44 to a suitable motor-driven variable-displacement pump, not shown in detail, but indicated at 45 in Fig. 1. Requisite controls for the pump fluid, whereby the pressure of the latter may be established at any required maximum, are indicated at 46 and 47. These controls, also not shown in detail, preferably include the necessary relief valves and by-passes, check-valves and ports as required for producing a means for turning the drum at a uniform speed as well as providing for a uniform steady acceleration and deceleration of the drum. The fluid drive forms no part of our invention and may be of any standard make.

As previously stated, the record of an indication or signal on the luminous surface 18 of the oscillograph is transmitted by the objective 38 to the surface of the drum 12, around which is wrapped a strip of photographic material, preferably a highly supersensitive film. The manner of inserting and placing the film to receive an image is as follows:

The casing 11 (Fig. 4) has an access door 50 above the shaft 40, and the drum 12 also has an access door 51, which will be aligned with door 50 when a hand wheel 52 on shaft 40 is turned by the operator until an arrow 53 (Fig. 2) on the wheel registers with a fixed index mark 54. The door 51 is normally held closed by a spring latch 55 (Fig. 4) which may be reached for disengagement by pushing a small spring-pressed shutter 56 (Fig. 3) inwardly. With the door 51 open, (Fig. 3) a pair of spindles 57 and 58 mounted on the rear wall of the drum are exposed to view. The operator then places a full spool 62 on spindle 57 and draws the leader strip upwardly and out of the drum between a pair of guide rollers 61. He then rotates the drum counterclockwise by means of the handwheel 52, holding the end of the leader in his right hand. When the drum has made a full revolution the rollers 61 are again on top as in Fig. 3, and the operator passes the leader downwardly between them and attaches its end to an empty spool 59 on spindle 58. The paper leader now encircles the drum but may not lie tightly against the periphery or rim surface 12a, and the film, if drawn around the rim, may also be wavy and out of the focal plane of objective 38. The record on the film, under such a condition, would be blurred and useless. It is necessary, therefore, to take up this slack, and means for so doing will be presently described.

The operator now closes doors 51 and 50. These doors are made light-tight in any conventional manner, as by a flange-and-channel construction indicated in Fig. 4. When the doors are closed, the operator turns the drum a half revolution, until the arrow 53 on handwheel 52 registers exactly with the lower index mark 54a (Fig. 2). At this point the center of spool spindle 58 (Fig. 4) is aligned with a short shaft 63, mounted to slide in bearings 64 in the front of casing 11. The shaft 63, Fig. 4, has a keyed inner end 65, adapted, when the shaft is pushed inwardly, to engage a slot in the front end of spindle 58 on which the empty spool 62 is mounted. It should be noted that the spools 59 and 62 are both so constructed that they are keyed to turn with their respective mounting spindles.

As the shaft 63 is a pushed in and engaged with the spindle as aforesaid, a bevel gear 67 (Fig. 4) simultaneously meshes into a mating gear 68 on a horizontal shaft 69. As the operator turns a crank 70, motion is transmitted through a second set of gears 71 and a vertical shaft 72 (Fig. 3) to a counter or footage indicator 73 mounted on the top of casing 11. Therefore, as the shaft 63 is turned, the leader paper is drawn around the drum, the spindle 57 being free to rotate, as will be more fully explained. When the counter 73 indicates a known figure, the operator is thereby informed that the paper leader is all wound on spool 59 and the drum is completely encircled with a strip of sensitized film. It now remains to take up the slack as before noted.

The spool 62 has on its rear end (Fig. 3) a ratchet 74, adapted to be engaged by a bellcrank pawl 75. A link 76 has a slot-and-pin connection at its upper end with an arm of this pawl, and is pivoted on an eccentric 77 at its lower end. When the shaft 63 is engaged with the spindle 58 the shaft 78 on which eccentric 77 is mounted is in line with a slidable shaft 79 guided in bearings 80 (Fig. 4) and having a handle 81 outside casing 11. When shaft 79 is pushed inwardly against a spring 82 its inner end engages shaft 78, (Fig. 3) and then a half-revolution of shaft 79 will turn the eccentric 77 and cause pawl 75 to engage the ratchet 74. Spool 62 is thereby held against rotation and no more film can be unwound therefrom. The operator then carefully turns crank 70 until he feels a reasonable tension or resistance, and thereby knows that all of the slack is taken out of the film encircling the drum, and that the film (the outer side thereof being the emulsion surface) is held snugly to the drum all around. A ratchet 83 (Fig. 3) on spool 59 is then held by a pawl 84 and thereby maintains the tension of the film. The operator withdraws shaft 63, and the shaft 79 is disengaged from shaft 78 by spring 82, and the drum is then in condition to be rotated. The shafts 79, 63 and another stub shaft 58b are locked in the withdrawn position by engagement of a three-armed yoke 85 in suitable grooves, this yoke being mounted on a stud 86 and movable by a lever 87. A micro switch M' is positioned to be closed by the yoke when the latter is in locked position.

In setting up the machine the rate of the sweep of the oscillograph trace is the most easily controlled of the variable factors. The drum speed may be selected to separate the frequencies and the length of the record may be controlled by the lens movement rate. Of course, the selected factors must be such that enough light must be passed to the film to make a developable trace thereon.

The record is made when the operator momentarily depresses handle 34, (Fig. 7) which disengages pawl 27 from the one-tooth ratchet 26 and permits the turret 20 to be driven by motor 23 through one revolution, always at the same speed. The turret 20 actually serves as a shutter, inasmuch as the space between it and the end of the casing 11 is provided with light-locking means, such as an annular flange 88 (Fig. 6) on the turret which enters an annular groove 89 on the casing, and therefore the "exposure" occurs only as the beam projected through the lens 38 passes through the arcuate slot 39.

So that some definite analysis of the photographed signal indication may be made, a time-element must be associated with the rotation of the drum in some manner. This has been accomplished by providing close to the rim of the drum a "flasher" which may impress light in separated spots along both edges of the film. The flasher must, of course, operate at a constant speed and preferably for not more than one revolution of the drum, else the flash record would overlap. This is not desirable, but by measuring from the center of the marks overlapping is not too detrimental. Such a flasher may comprise a flat disk 90 (Fig. 9) on the shaft of a synchronous motor 91, mounted on a plate 92. Two small lamps 93 are located 180 degrees apart on the plate and each lamp is in a housing 94. A small aperture 95 in the end of each housing permits a pencil of light to reach the film F near each edge whenever one of a series of apertures 96 in the disk 90 passes said aperture. In the present structure the disk is so designed in relation to the speed of the synchronous motor that approximately 1000 flashes per second will reach each edge of the film. Therefore, these will be recorded on the film as a succession of elongated dots 97, and the space between center of any two successive dots will represent one one-thousandth of a second. The developed film may resemble Fig. 8, in which it will be noted that in exposing the film the drum made 5 revolutions during the passage of the objective 38 along slot 39. There are approximately 5 cycles of the trace 98 between the center of adjacent dots 97, indicating that this particular signal had a frequency of 5000 cycles.

The speed of the drum may be indicated on a tachometer scale 118 (Fig. 2) calibrated in "inches per second," the pointer on this scale being controlled with the output of current from a small generator 111 (Fig. 1), driven from shaft 40 by a belt or chain connection 112.

In order that the flasher lamps 93 may be "on" for only a short interval which will be less than the time required for one revolution of the drum even at its highest speed, mechanism is provided for closing a circuit through one lamp momentarily and immediately after this circuit is opened, to close the circuit through the other lamp for a similar interval. This arrangement aids in the detection of any change in signal frequency which may have occurred during one rotation of the lens turret. To this end, the turret drive gear 22 (Figs. 11, 12) has a contact plate 99 mounted on an insulating support 100, which is adjustable circumferentially on studs 101. As the gear 22 makes one revolution (with the turret 20) the contact plate 99 wipes first over a pair of brushes 102, thereby closing a circuit through one of the lamps 93, and after the plate has moved off from these brushes it bridges a second pair 103 for a similar time interval to close the circuit through the other lamp.

The motor 91 may be controlled by a switch 104 on the panel 105 (Fig. 2). This panel for convenience may also carry a switch 106 controlling motor 23, and start-stop buttons 108 for the motor (not shown) driving hydraulic pump 45. Safety indicators 107, controlled by suitable interlocking circuits may also be provided to indicate that the shaft 63, 79 and 86 have been withdrawn and that all doors are closed. As these details are not a part of the invention claimed herein, they are not shown in the drawings and will not be further described.

The safety indicators may be associated with a plurality of micro-switches or similar devices, only one of which, M', (Fig. 3) is shown in the drawings. Micro switches may be operated by shafts 63, 79 and 58b, and others by the doors 50 and 51. All of the switches may be in series and connected with start-stop buttons 108 in such a manner that the drum 12 can not be power driven until all interferring elements have been withdrawn.

After one trace has been completed, that is, after the turret 20 and objective lens 38 have made one revolution and stopped, the hydraulic controls 108, 109 are operated to bring the drum to rest. Then, without opening the door 50 again, a new wrap of film may be wound onto spool 60 when shaft 63 is again pushed in to engage the spindle 58, the arrow on wheel 52 of course being first brought to the index mark 54a. It is desirable before winding this second wrap, to relieve the film tension by means of the eccentric 78 and the link 76, the tension being restored by a reverse movement of the eccentric as before.

Ears or flaps 57a and 58a (Fig. 3) are provided to engage and support the outer ends of spool spindles 57 and 58, and to retain the spools 59 and 62 thereon, and these ears enable an operator to remove a spool. While possible to remove film at any time, it is preferable not to remove only part of a roll as this may upset the dynamic balance. While we avoided using a balance weight to make up for shifting of film from one spool to the other in some cases this may be desirable.

In Fig. 8 of the drawings a fragmentary section of a typical film is shown on a reduced scale (since we prefer to use a film width of 4½" in this particular embodiment of our invention). This film shows a portion of a spiral trace 98 made by our camera and the space between the dots 97 on the extreme edges of the film F indicate 1/1000 of a second elapsed time, so that by counting the oscillations it will be noticed that there are approximately 5 oscillations, or, 5,000 oscillations per second took place during this particular recording.

As pointed out above in the specification, we have been able to make a record indicating 1,000,000 oscillations per second with the apparatus set for producing its highest speeds.

It will be noticed that by moving the objective through a conical path with respect to its axis of rotation and by having the image to be photographed at the apex of the conical path, a trace may be produced as long as the objective 38 is moving across the slot 39 and when beyond the slot 39 in either direction, the plate 11 will serve as a fixed-position shutter for preventing the film F from being exposed. By providing a camera casing totally enclosing a drum which is, in itself, substantially light-tight, we have been able to adequately protect the film, and by providing a door on the drum through which the film may be loaded into the drum, the door extending outwardly at least partially through a door in the camera casing, it is a simple matter to determine when the apparatus is in an open position for threading so that there is but little opportunity for improper operation of the machine. The micro switch circuit, which also prevents improper operation of the machine, does not form a part of our present invention.

We claim:

1. A high-speed camera comprising, in combination, a camera casing, a drum revolvably mounted therein, means for supporting a film on the periphery of the drum, an objective adapted to form an image of an object to be photographed on said film, a lens mount pivotally mounted on the camera carrying the objective to swing the objective across a film carried by the drum, the axis of the objective relative to the film being inclined at an angle selected to maintain the conjugate foci of the lens substantially constant relative to the film and the object to be photographed whereby said object being photographed and positioned on the axis of the pivotally mounted lens mount may remain in focus throughout relative movement of the lens and film supported by the drum.

2. A high-speed camera comprising, in combination, a camera casing, a drum revolvably mounted therein, means for supporting a film on the periphery of the drum, an objective adapted to form an image of an object to be photographed on said film, a lens mount pivotally mounted on the camera carrying the objective to swing the objective across a film carried by the drum, the axis of the objective relative to the film being inclined at an angle selected to maintain the conjugate foci of the lens substantially constant relative to the film and the object to be photographed whereby said object being photographed and positioned on the axis of the pivotally mounted lens mount may remain in focus throughout relative movement of the lens and film supported by the drum, and power means for moving the drum and objective.

3. A high-speed camera comprising, in combination, a power means, a camera casing, a drum revolvably mounted therein, means for supporting a film on the periphery of the drum, an objective adapted to form an image of an object to be photographed on said film, a lens mount pivotally mounted on the camera carrying the objective to swing the objective across a film carried by the drum, the axis of the objective relative to the film being inclined at an agle selected to maintain the conjugate foci of the lens substantially constant relative to the film and the object to be photographed whereby said object being photographed and positioned on the axis of the pivotally mounted lens mount may remain in focus throughout relative movement of the lens and film supported by the drum, said power means including gearing between the lens mount and power means for moving the objective through an arcuate path in a direction across the film.

4. A high-speed camera comprising, in combination, a camera casing, a drum revolvably mounted therein, means for supporting a film on the periphery of the drum, an objective adapted to form an image of an object to be photographed on said film, a lens mount pivotally mounted on the camera carrying the objective to swing the objective across a film carried by the drum, the axis of the objective relative to the film being inclined at an angle selected to maintain the conjugate foci of the lens substantially constant relative to the film and the object to be photographed whereby said object being photographed and positioned on the axis of the pivotally mounted lens mount may remain in focus throughout relative movement of the lens and film supported by the drum, a power drive for the drum, a constantly driven clutch member, a clutch member engageable therewith, gearing connecting the lens mount and a clutch member, and means for engaging the clutch members for driving the objective on its lens mount.

5. A high-speed camera comprising, in combination, a camera casing, a drum revolvably mounted therein, means for holding a film about the periphery of the drum, an objective, a lens mount carrying the objective comprising a gear movably mounted on an axis, a fixed mask plate between the objective and drum having an arcuate slot therein, means carried by the gear for holding the objective with the axis thereof at an angle to the film and passing through a point on the axis of the gear, the axis of the objective passing through the arcuate slot in certain positions of the gear, means for moving the gear and the drum carrying the film whereby an exposure may be made on the moving film by the objective moving on its gear and passing the arcuate slot.

6. A high-speed camera comprising, in combination, a camera casing, a drum revolvably mounted therein, means for holding a film about the periphery of the drum, an objective, a lens mount comprising a gear movably mounted on an axis, a fixed mask plate between the objective and drum having an arcuate slot therein, means carried by the gear for holding the objective with the axis thereof passing through a point on the axis of the gear, the axis of the objective passing through the arcuate slot in certain positions of the gear, means for moving the gear and film whereby an exposure may be made on the moving film by the moving objective passing the arcuate slot, and means for preventing light from passing to the film except through the slot whereby said slot may serve as a fixed shutter through which light passes from the objective to the film during movement of the gear.

7. A high-speed camera comprising, in combination, a camera casing, a drum revolvably mounted therein, means for holding a film about the periphery of the drum, an objective, a lens mount carrying the objective and comprising a movable gear mounted on an axis, a fixed mask plate between the objective and drum having an arcuate slot therein, means carried by the gear for holding the objective with the axis thereof passing through a point on the axis of the gear, the axis of the objective passing through the arcuate slot in certain positions of the gear, means for moving the gear and film whereby an exposure may be made on the moving film by the moving objective passing the arcuate slot, and means for preventing light from passing to the film except through the slot whereby said slot may serve as a fixed shutter through which light passes from the objective to the film during movement of the gear, said means for moving the gear being adapted to drive said gear a distance materially greater than the length of the slot whereby said lens mount may move both before and after the objective is passed over the arcuate slot to make an exposure.

8. A high-speed camera including, in combination, a camera body, a drum revolvably mounted therein, means for holding film on the drum for exposure, an objective, a lens board for movably carrying the objective through a path in which the objective axis of the objective follows a cone-shaped path, a fixed mask plate between the objective and drum having an arcuate slot of a curvature to pass light from the objective to a film on the drum, said arcuate slot having a length of approximately the width of the film, and means for moving the drum and lens board at the same time, thereby causing the objective to pass the fixed arcuate slot making an exposure therethrough on the moving film and to pass the end of the slot thereby terminating the exposure.

9. A high-speed camera including, in combination, a camera body, a drum revolvably mounted therein, means for holding film on the drum for exposure, an objective, a lens board for movably carrying the objective through a path in which the objective axis of the objective follows a cone-shaped path, an oscillograph mounted at the apex of the cone-shaped path of the objective axis, said objective being focused thereon, a mask plate between the objective and drum having an arcuate slot of a curvature to pass light from the objective to a film on the drum, said arcuate slot having a length of approximately the width of the film, and means for moving the drum and lens board at the same time, thereby causing the objective to pass the arcuate slot making an exposure therethrough and to pass the end of the slot thereby terminating the exposure.

10. A high-speed camera including, in combination, a camera body, a drum revolvably mounted therein, means for holding film on the drum for exposure, an objective, a lens board for movably carrying the objective through a path in which the objective axis of the objective follows a cone-shaped path, an oscillograph mounted at the apex of the cone-shaped path of the objective axis, said objective being focused thereon, a mask plate between the objective and drum having an arcuate slot of a curvature to pass light from the objective to a film on the drum, and said arcuate slot having a center on an axis passing through the cone-shaped path of the objective, said arcuate slot having a length of approximately the width of the film, and means for moving the drum and lens board at the same time, thereby causing the objective to pass the arcuate slot making an exposure therethrough and to pass the end of the slot thereby terminating the exposure.

11. In a high-speed camera, the combination with a camera case, of a drum rotatably supported therein, means to drive the drum, a film support carried by the drum inside thereof and a film-supporting surface extending about the periphery of the drum and to and from the film support inside of the drum, a lens mount comprising a pivoted plate carried by the camera case, an objective mounted on the pivoted plate and having an axis extending at an angle to the pivot supporting the plate, a masking plate between the lens and the drum having a slot therein for passing light rays through the objective carried by the lens mount to a film carried by the drum, the movement of the pivoted plate being of an extent to move the lens a distance materially greater than the length of the slot whereby said slot may serve as a shutter to admit light only when the objective is in alignment therewith.

CLIFTON M. TUTTLE.
EDGAR O'NEIL.

REFERENCES CITED

The following references are of record in the file of this patent:

UNITED STATES PATENTS

| Number | Name | Date |
| --- | --- | --- |
| Re. 18,956 | Dyche | Sept. 19, 1933 |
| 572,699 | Dunn | Dec. 8, 1896 |
| 1,300,191 | Pogue | Apr. 8, 1919 |
| 1,707,980 | Guerin | Apr. 9, 1929 |
| 1,791,207 | Hindle | Feb. 3, 1931 |
| 1,810,021 | Legg | June 16, 1931 |
| 1,854,742 | Jenkins | Apr. 19, 1932 |
| 1,864,213 | Pelty et al. | June 21, 1932 |
| 2,049,917 | Mallina | Aug. 4, 1936 |
| 2,169,011 | Wengel | Aug. 8, 1939 |
| 2,186,268 | Pakala | Jan. 9, 1940 |
| 2,204,819 | O'Brien | June 18, 1940 |
| 2,259,228 | Rankin | Oct. 14, 1941 |
| 2,293,349 | Martin et al. | Aug. 18, 1942 |
| 2,428,369 | Kammer | Oct. 7, 1947 |
| 2,446,200 | Tait et al. | Aug. 3, 1948 |
| 2,527,562 | McCormick | Oct. 31, 1950 |